(12) United States Patent
Hasegawa et al.

(10) Patent No.: US 11,285,842 B2
(45) Date of Patent: Mar. 29, 2022

(54) FUEL CELL VEHICLE

(71) Applicant: TOYOTA JIDOSHA KABUSHIKI KAISHA, Toyota (JP)

(72) Inventors: Takahiko Hasegawa, Toyota (JP); Shunji Inoue, Okazaki (JP); Kenji Tsubosaka, Nagakute (JP); Kimihiko Teshima, Miyoshi (JP); Takanori Kito, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/659,690

(22) Filed: Oct. 22, 2019

(65) Prior Publication Data
US 2020/0164769 A1 May 28, 2020

(30) Foreign Application Priority Data
Nov. 27, 2018 (JP) .............................. JP2018-220961

(51) Int. Cl.
B60L 58/40 (2019.01)
H01M 16/00 (2006.01)
H01M 10/44 (2006.01)
B60L 15/20 (2006.01)
B60L 7/10 (2006.01)

(52) U.S. Cl.
CPC ........... *B60L 58/40* (2019.02); *B60L 15/2072* (2013.01); *H01M 10/44* (2013.01); *H01M 16/006* (2013.01); *B60L 7/10* (2013.01); *B60L 2210/14* (2013.01); *B60L 2240/26* (2013.01); *B60L 2240/54* (2013.01); *H01M 2220/20* (2013.01);

(Continued)

(58) Field of Classification Search
CPC ...... B60L 15/20; B60L 15/2072; B60L 53/00; B60L 53/22; B60L 53/34; B60L 58/40; H01M 10/44; H01M 16/006; H01M 2250/20; H01M 2220/20; B60K 6/00; B60K 1/02
USPC ......... 307/10.1, 10.7, 9.1, 64, 66, 80, 82, 43
See application file for complete search history.

(56) References Cited

U.S. PATENT DOCUMENTS 6,672,415 B1 * 1/2004 Tabata ................... B60K 6/365 180/65.25
7,766,788 B2 * 8/2010 Shamoto ............... B60W 10/06 477/3

(Continued)

FOREIGN PATENT DOCUMENTS

| JP | 2008-163781 A | 7/2008 |
| JP | 2009-117070 A | 5/2009 |
| JP | 2015-071954 A | 4/2015 |

Primary Examiner — Rexford N Barnie
Assistant Examiner — Terrence R Willoughby
(74) Attorney, Agent, or Firm — Dickinson Wright, PLLC

(57) ABSTRACT

There is provided a fuel cell vehicle comprising a motor configured to perform a regenerative operation and to drive the fuel cell vehicle; a fuel cell; a secondary battery; and a control unit. The control unit comprises a weight acquirer configured to obtain a current weight of the fuel cell vehicle; and a charge discharge controller configured to set a higher value to an upper limit value and to set a lower value to a lower limit value when the current weight calculated by the weight acquirer is an increased weight that is larger than a reference value, compared with the upper limit value and the lower limit value set when the current weight is the reference weight.

6 Claims, 7 Drawing Sheets

(52) U.S. Cl.
  CPC .. *H01M 2250/20* (2013.01); *H01M 2250/402* (2013.01)

(56) References Cited

U.S. PATENT DOCUMENTS

| | | |
|---|---|---|
| 2010/0090818 A1 | 4/2010 | Sekiyama et al. |
| 2010/0316921 A1 | 12/2010 | Koshida et al. |
| 2012/0179420 A1* | 7/2012 | Gilman .............. G01C 21/3697 702/165 |
| 2018/0229771 A1* | 8/2018 | Sekine ................ B62D 21/152 |
| 2019/0106317 A1* | 4/2019 | Sahota .................. G06Q 30/06 |
| 2020/0017043 A1* | 1/2020 | Kato ........................ B60L 7/10 |

* cited by examiner

FUEL CELL VEHICLE

CROSS REFERENCE TO RELATED APPLICATIONS

The present application claims priority from Japanese patent application 2018-220961 filed on Nov. 27, 2018, the entirety of the disclosure of which is hereby incorporated by reference into this application.

BACKGROUND

Field

The present disclosure relates to a technique of a fuel cell vehicle.

Related Art

A known configuration of a fuel cell vehicle supplies electric power from a fuel cell and a secondary battery to a driving motor (as described in, for example, JP 2009-117070A).

The current weight of the fuel cell vehicle described above is likely to be varied according to the number of occupants riding in the vehicle and the luggage mounted on the vehicle. In the case of an increase in a required amount of electric power that is required by the fuel cell vehicle by varying the current weight of the vehicle, this is likely to increase the amount of electric power that is directly supplied from the fuel cell to the driving motor and to reduce the power generation efficiency of the fuel cell. Accordingly, there has been a demand for a technique to suppress reduction of the power generation efficiency of the fuel cell.

SUMMARY

The present disclosure may be implemented by the following aspects.

According to one aspect of the present disclosure, there is provided a fuel cell vehicle. This fuel cell vehicle comprises a motor configured to perform a regenerative operation and to drive the fuel cell vehicle; a fuel cell configured to supply electric power to the motor; a secondary battery connected to be electrically in parallel to the fuel cell and configured to supply electric power to the motor and to be charged with electric power generated by the fuel cell and with regenerative power generated by the regenerative operation; and a control unit configured to control charge and discharge of the secondary battery, such that a state of charge of the secondary battery is placed between an upper limit value and a lower limit value. The control unit comprises a weight acquirer configured to obtain a current weight of the fuel cell vehicle; and a charge discharge controller configured to set a higher value to the upper limit value and to set a lower value to the lower limit value when the current weight calculated by the weight acquirer is an increased weight that is larger than a reference value, compared with the upper limit value and the lower limit value set when the current weight is the reference weight.

DETAILED DESCRIPTION OF EMBODIMENTS

A. First Embodiment

Figure 1:
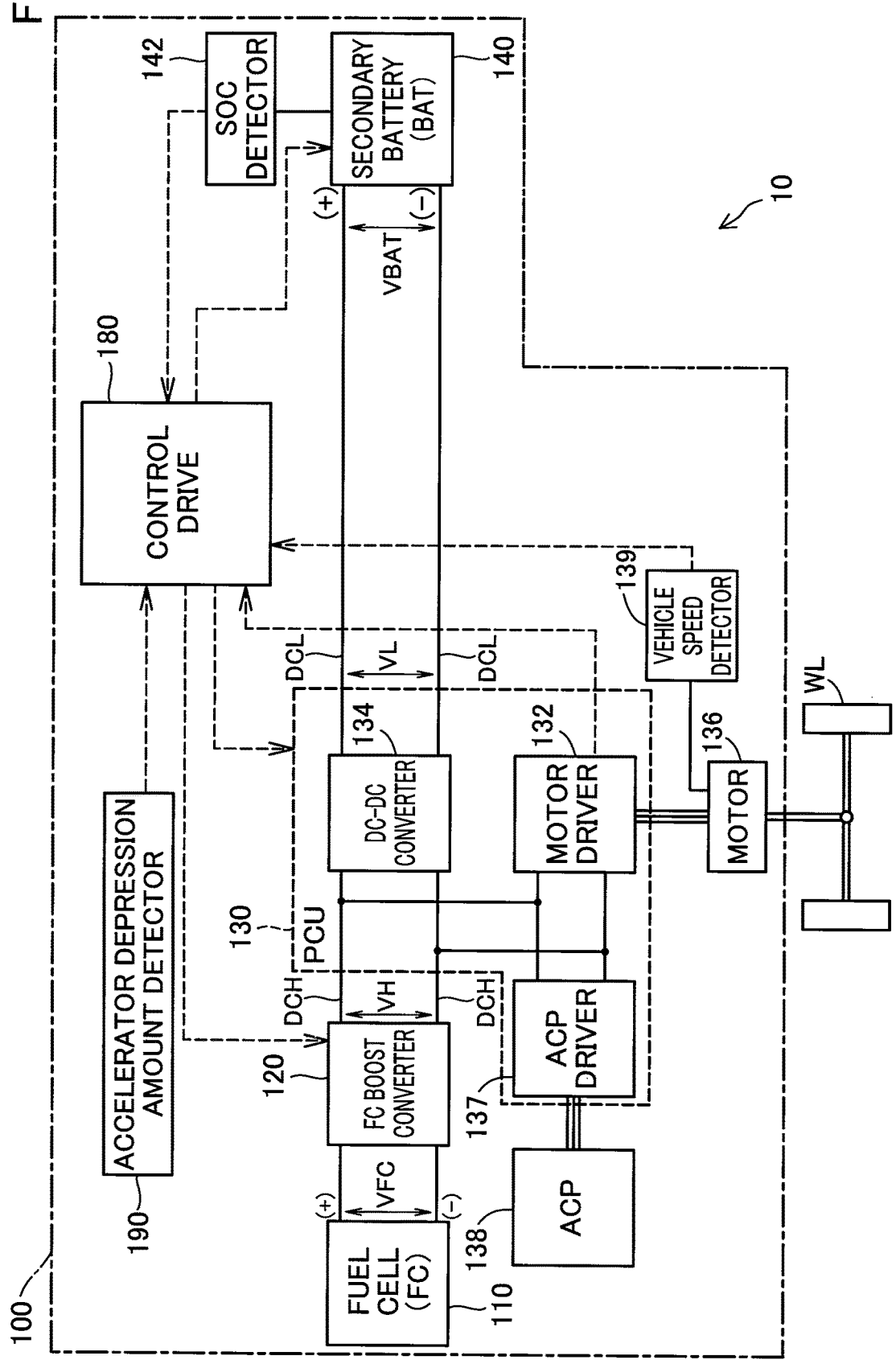
FIG. 1 is a schematic diagram illustrating the configuration of a fuel cell vehicle equipped with a fuel cell system according to a first embodiment.
Figure 2:
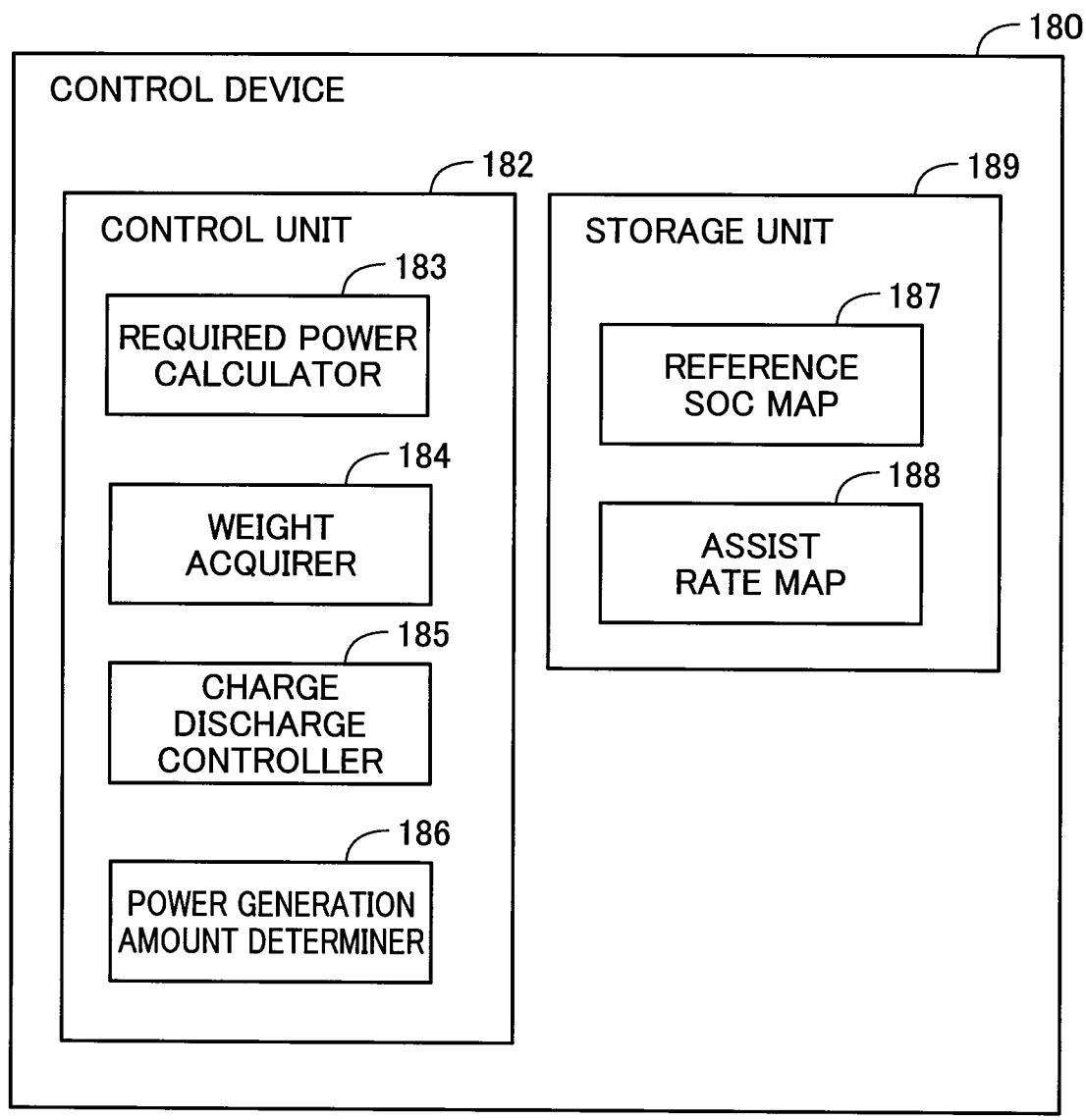
FIG. 2 is an internal block diagram illustrating a control device.

FIG. 1 is a schematic diagram illustrating the configuration of a fuel cell vehicle 10 equipped with a fuel cell system 100 according to a first embodiment. FIG. 2 is an internal block diagram illustrating a control device 180. The fuel cell vehicle 10 (shown in FIG. 1) includes the fuel cell system 100 and wheels WL. The fuel cell system 100 includes a fuel cell 110, an FC boost converter 120, a power control unit (PCU) 130, a motor driver 132, a motor 136, an air compressor (ACP) 138, a vehicle speed detector 139, a secondary battery 140, an SOC detector 142, a control device 180 and an accelerator depression amount detector 190. The fuel cell vehicle 10 is driven with supply of electric power from the fuel cell 110 and the secondary battery 140 to the motor 136.

The fuel cell 110 is a polymer electrolyte fuel cell configured to receive supplies of hydrogen and oxygen as reactive gases and generate electric power. The fuel cell 110 is, however, not limited to the polymer electrolyte fuel cell. Any of other different types of fuel cells may be employed as the fuel cell 110. The fuel cell 110 is connected with a high voltage DC wiring DCH via the FC boost converter 120 and is further connected with the motor driver 132 included in the PCU 130 via the high voltage DC wiring DCH. The FC boost converter 120 is configured to boost up an output voltage VFC of the fuel cell 110 to a high voltage VH that is usable by the motor driver 132. The fuel cell system 100 further includes a mechanism (not shown) configured to supply and discharge reactive gases (a fuel gas and an oxidizing gas) to and from the fuel cell 110 and a cooling circulation system configured to regulate the temperature of the fuel cell 110.

The motor driver 132 is configured by a three-phase inverter circuit and is connected with the motor 136. The motor driver 132 is configured to convert the output power of the fuel cell 110 supplied via the FC boost converter 120 or the output power of the secondary battery 140 supplied via a DC-DC converter 134 into a three-phase AC power and supply the three-phase AC power to the motor 136. The motor 136 is configured by a synchronous motor provided with three-phase coils to drive the wheels WL via a gear and the like. Accordingly, the motor 136 is a motor serving to drive the fuel cell vehicle 10. The motor 136 is capable of performing regenerative operation that regenerates kinetic energy of the fuel cell vehicle 10 during braking of the fuel cell vehicle 10. The motor 136 also serves as a generator to generate regenerative power by this regenerative operation. The vehicle speed detector 139 is configured to detect the vehicle speed of the fuel cell vehicle 10 and send the detected vehicle speed to the control device 180.

The DC-DC converter 134 is configured to adjust the voltage level of the high voltage DC wiring DCH in response to a driving signal output from the control device 180 and change over the charge/discharge state of the secondary battery 140. When regenerative power is generated by the motor 136, the regenerative power is converted into DC power by the motor driver 132 and is charged into the secondary battery 140 via the DC-DC converter 134. At least part of the electric power generated by the fuel cell 110 may be charged into the secondary battery 140.

The ACP driver 137 is configured by a three-phase inverter circuit and is connected with the ACP 138. The ACP driver 137 is configured to convert the output power of the fuel cell 110 supplied via the FC boost converter 120 or the output power of the secondary battery 140 supplied via the DC-DC converter 134 into a three-phase AC power and supply the three-phase AC power to the ACP 138. The ACP 138 is configured by a synchronous motor provided with three-phase coils. This motor is driven according to the supplied electric power, so as to supply oxygen (the air) used for power generation to the fuel cell 110.

The secondary battery 140 is a power storage device configured to be discharged and supply electric power to the motor 136 and to be charged with the electric power generated by the regenerative operation of the motor 136. The secondary battery 140 may be configured by, for example, a lithium ion rechargeable battery. The secondary battery 140 is connected to be electrically parallel to the fuel cell 110 relative to a power consuming source, such as the motor 136. The secondary battery 140 is not limited to the lithium ion rechargeable battery but may be any of other different types of batteries, such as a lead acid battery, a nickel cadmium battery or a nickel metal hydride battery. The secondary battery 140 is connected with the DC-DC converter 134 included in the PCU 130 via a low voltage DC wiring DCL and is further connected with the high voltage DC wiring DCH via the DC-DC converter 134.

The SCO detector 142 is configured to detect the state of charge (SOC) of the secondary battery 140 and to send the detected SOC to the control device 180. In the description hereof, the "state of charge (SOC)" denotes a ratio of the remaining amount of charge to the current charging capacity of the secondary battery 140. Hereinafter, the state of charge (SOC) of the secondary battery 140 detected by the SOC detector 142 is expressed as the "state of charge Rsoc". The SOC detector 142 is configured to detect the temperature, the output voltage and the output current of the secondary battery 140 and to detect the state of charge Rsoc based on these detected values.

The accelerator depression amount detector 190 is configured to detect the driver's depression amount of an accelerator of the fuel cell vehicle 10 and to send the detection result to the control device 180.

The control device 180 (shown in FIG. 2) is configured by a microcomputer including a control unit 182 and a storage unit 189. The control unit 182 performs various programs stored in the storage unit 189, so as to serve as a required power calculator 183, a weight acquirer 184, a charge discharge controller 185 and a power generation amount determiner 186. The storage unit 189 stores therein a reference SOC map 187 and an assist rate map 188.

The control unit 182 detects any of the driver's various operations, such as an accelerator operation and controls power generation of the fuel cell 110 and charge and discharge of the secondary batter 140 in response to the detected operation. The control unit 182 also generates driving signals according to the driver's depression amount of the accelerator and respectively sends the driving signals to the motor driver 132 and to the DC-DC converter 134.

The motor driver 132 regulates, for example, the pulse width of an AC voltage in response to the driving signal received from the control device 180 and thereby causes the motor 136 to be rotated and driven corresponding to the driver's depression amount of the accelerator.

The required power calculator 183 serves to calculate a required torque that is required by the motor 136. The required torque is calculated by using various pieces of information, for example, the driver's depression amount of the accelerator, the current weight, the current vehicle speed, and the shift position of a shift lever. The required power calculator 183 uses the calculated required torque of the motor 136 to calculate a required amount of power that is required by the motor 136. For example, the required power calculator 183 may calculate the required amount of power of the motor 136 by using a map that specifies a required amount of power of the motor 136 according to the driver's depression amount of the accelerator and the current weight or may calculate the required amount of power of the motor 136 from a driving force that is required by the motor 136.

The weight acquirer 184 serves to obtain the current weight of the fuel cell vehicle 10. The "current weight" herein means the present weight of the fuel cell vehicle 10 and denotes a sum of the weight of the vehicle body, the total weight of occupants currently riding in the vehicle, and the total weight of luggage mounted on the vehicle. Accordingly, the current weight is varied by the number of occupants and the weight of luggage mounted on the fuel cell vehicle 10. The weight acquirer 184 may detect, for example, the degree of a sink of the vehicle body caused by a sprung load of the fuel cell vehicle 10 (for example, an amount of displacement of a suspension) by means of a sensor to obtain the current weight.

The charge discharge controller 185 serves to correct the reference SOC map 187 by using the current weight obtained by the weight acquirer 184. The details of this correction will be described later.

The power generation amount determiner 186 serves to determine the amount of power generation by the fuel cell 110 by using the required amount of power of the motor 136 calculated by the required power calculator 183 and the amount of electric power dischargeable from the secondary battery 140. More specifically, the power generation amount determiner 186 refers to the reference SOC map 187 and the assist rate map 188 and gives priority to a power generation efficiency of the fuel cell 110 to determine the amount of power generation by the fuel cell 110 and the charge discharge amount of the secondary battery 140. The power generation efficiency of the fuel cell 110 denotes a ratio of energy generated by the fuel cell 110 (generated electric power) to energy that is expected to be generated by consumption of hydrogen.

Figure 3:
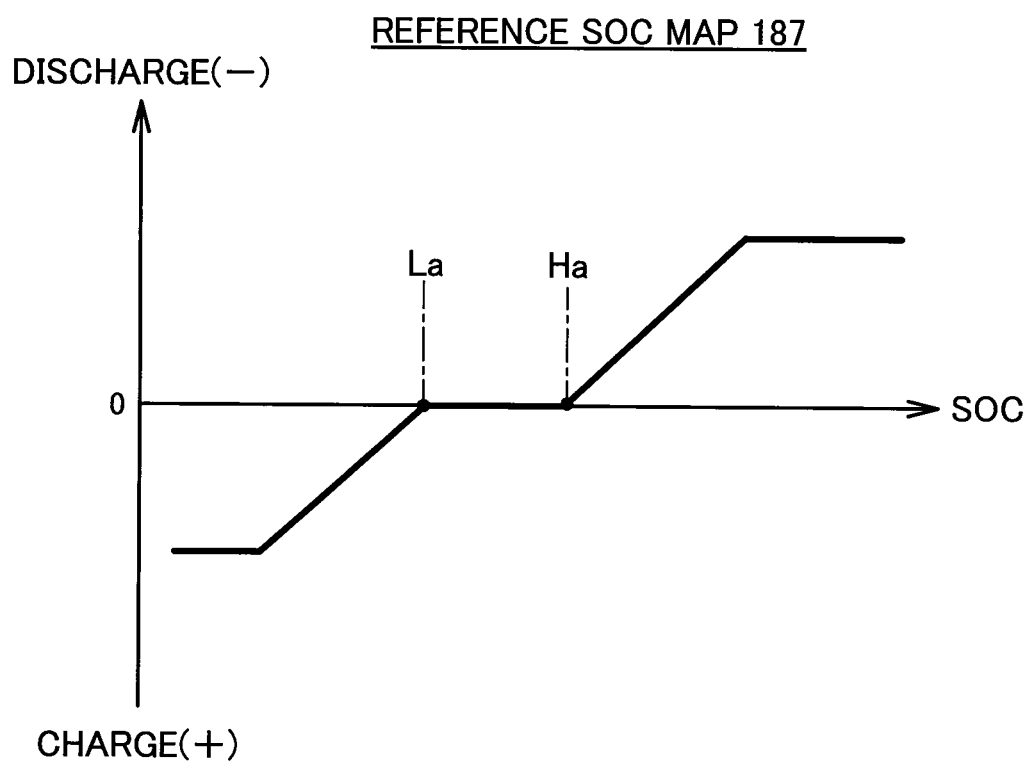
FIG. 3 is a diagram illustrating a reference SOC map.
Figure 4:
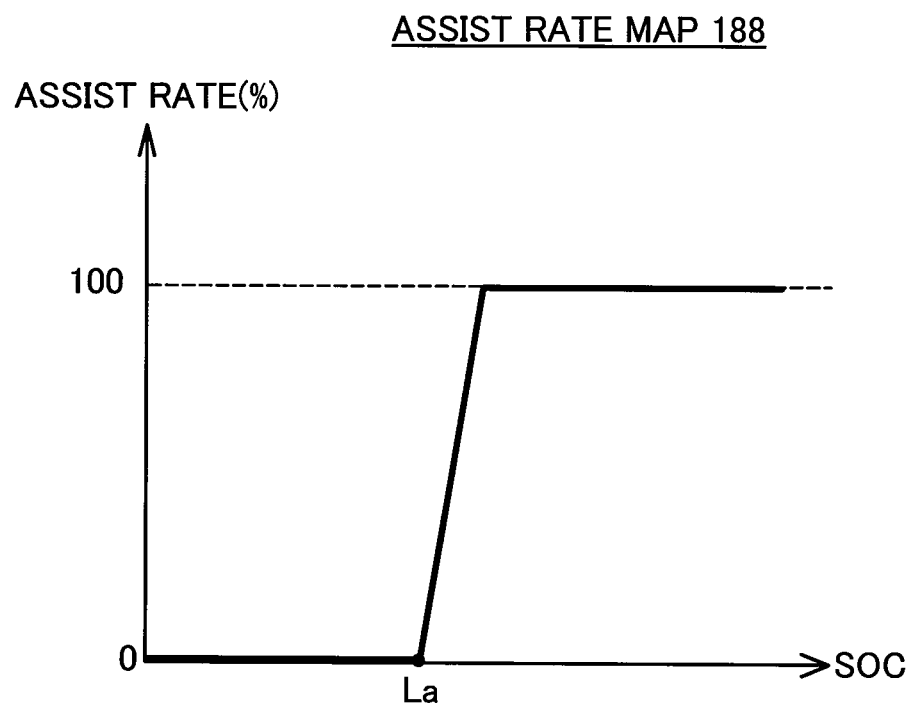
FIG. 4 is a diagram illustrating an assist rate map.

FIG. 3 is a diagram illustrating the reference SOC map 187. FIG. 4 is a diagram illustrating the assist rate map 188. FIG. 3 shows the state of charge (SOC) of the secondary battery 140 as abscissa and the charge discharge amount of the secondary battery 140 as ordinate. FIG. 4 shows the state of charge (SOC) of the secondary battery 140 as abscissa and the assist rate of the secondary battery 140 as ordinate. A decrease in assist rate decreases a ratio of the electric power supplied from the fuel cell 140, while increasing a ratio of the electric power supplied from the fuel cell 110.

The reference SOC map 187 (shown in FIG. 3) is a map indicating a relationship between the state of charge (SOC) of the secondary battery 140 and the charge discharge amount of the secondary battery 140 when the current weight of the fuel cell vehicle 10 is equal to or lower than a reference weight that is a reference value determined in advance.

When the current weight of the fuel cell vehicle 10 is equal to or smaller than the reference weight, the charge discharge controller 185 (shown in FIG. 2) controls charge and discharge of the secondary battery 140, based on the position of the state of charge Rsoc in the reference SOC map 187. More specifically, the charge discharge controller 185 charges or discharges the secondary battery 140, such that the state of charge Rsoc is placed between an upper limit value Ha and a lower limit value La. When the state of charge Rsoc becomes lower than the lower limit value La, the charge discharge controller 185 controls the secondary battery 140 to be forcibly charged with the regenerative power. When the charging amount is equal to or higher than the lower limit value La, the charge discharge controller 185 controls the secondary battery 140 to be discharged and supply the electric power to the motor 136. When the state of charge Rsoc is equal to or higher than the upper limit value Ha, on the other hand, the charge discharge controller 185 restricts the secondary battery 140 from being charged with the regenerative power. The discharging amount (output) of the secondary battery 140 is calculated as a product of a target discharging amount of the secondary battery 140 that is determined by referring to a map (not shown) from the required amount of power of the motor 136 and the assist rate that is determined by referring to the map of FIG. 4.

Figure 5:
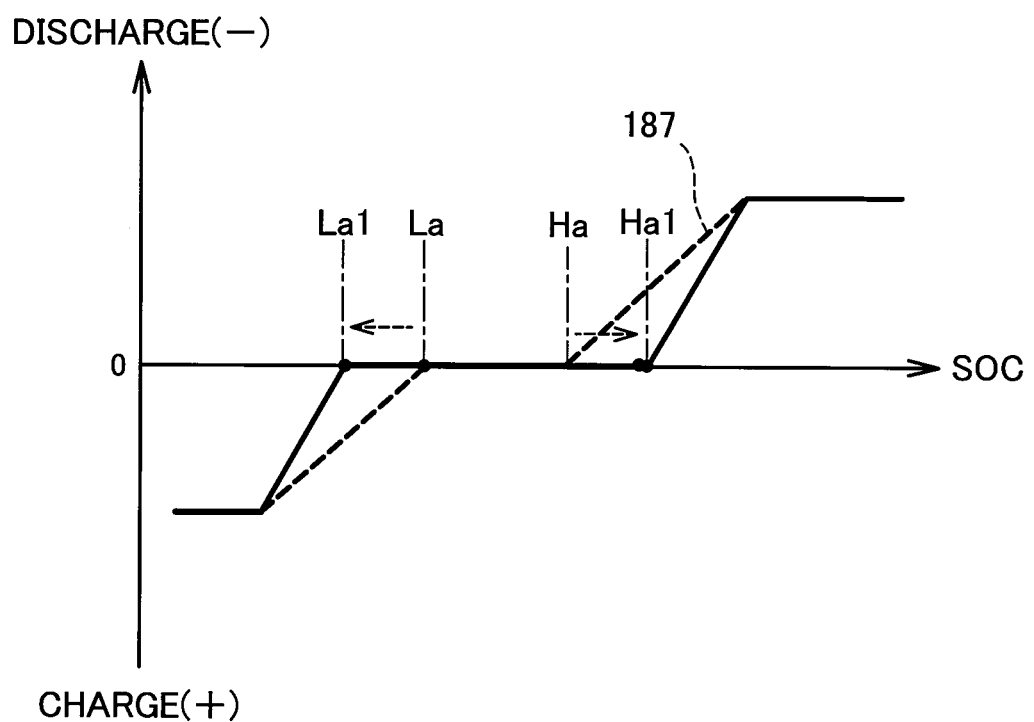
FIG. 5 is a diagram illustrating the control content performed by a charge discharge controller.

FIG. 5 is a diagram illustrating the control content performed by the charge discharge controller 185. When the current weight calculated by the weight acquirer 184 is an increased weight that is larger than the reference weight, on the other hand, the charge discharge controller 185 corrects the reference SOC map 187 and sets an upper limit value of the SOC to a value Ha1. This upper limit value Ha1 is a higher value than the upper limit value Ha set at the reference weight. For example, when the upper limit value Ha is equal to 70%, the charge discharge controller 185 sets the upper limit value Ha1 to 80%. When the current weight is the increased weight, the charge discharge controller 185 also sets a lower limit value of the SOC to a value La1. This lower limit value La1 is a lower value than the lower limit value La set at the reference weight. For example, when the lower limit value La is equal to 30%, the charge discharge controller 185 sets the lower limit value La1 to 20%.

Figure 6:
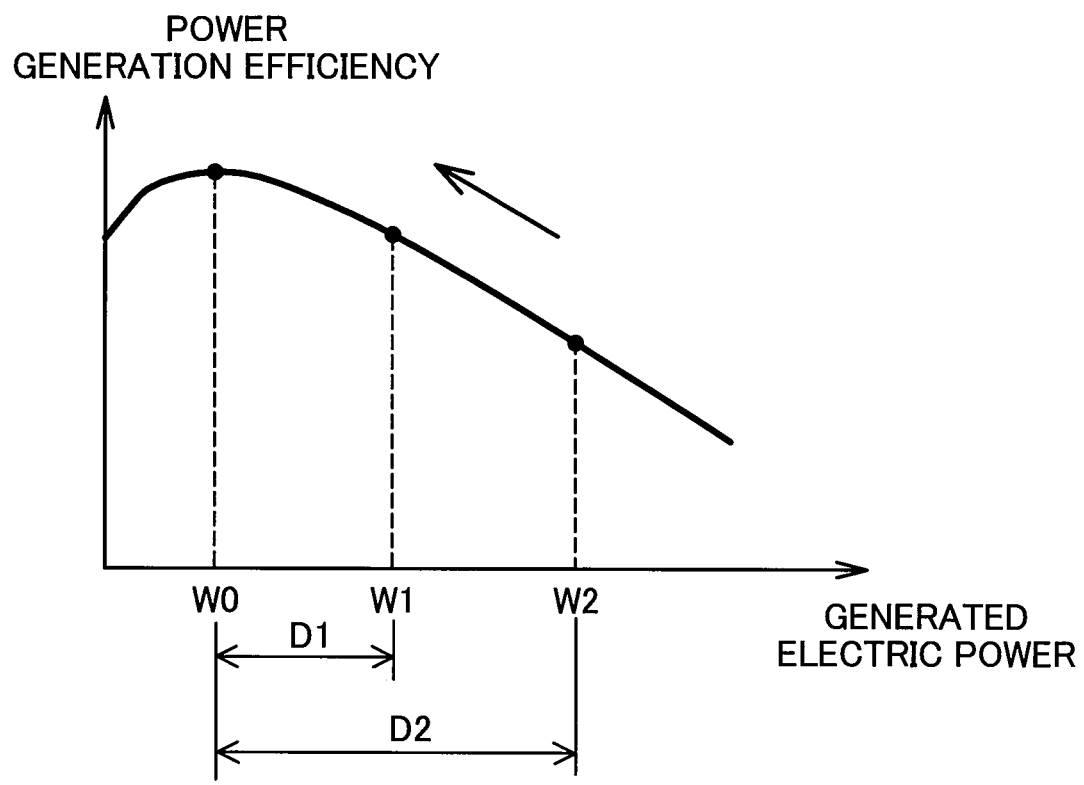
FIG. 6 is a diagram illustrating distribution of electric power performed by a control unit.

FIG. 6 is a diagram illustrating distribution of electric power performed by the control unit 182. The following concretely describes distribution of electric power in the case where the fuel cell vehicle 10 is accelerated. It is here assumed that the required amount of power of the motor 136 is equal to a value W1 when the current weight of the fuel cell vehicle 10 is a first weight that is equal to or smaller than the reference weight. When the current weight is a second weight that is larger than the reference weight, on the other hand, the required amount of power of the motor 136 becomes equal to a value W2 that is larger than the required amount of power W1, irrespective of a fixed depression amount of the accelerator. The fuel cell 110 has the higher power generation efficiency in a region of the lower load. More specifically, the power generation efficiency has the highest value when the amount of power generated by the fuel cell 110 is equal to a value W0 and gradually decreases with an increase in the amount of generated power from the value W0.

The following describes a procedure of controlling the amount of electric power when the current weight is the second weight in the case where the driver steps on the accelerator to give an acceleration request of the fuel cell vehicle 10. With a view to causing the fuel cell 100 to generate electric power in a region of the high power generation efficiency, the amount of electric power that is to be supplied from the secondary battery 140 to the motor 136 (for example, a difference D2 between the value W2 and the value W0) is set to be larger than the amount of electric power that is to be supplied from the secondary battery 140 to the motor 136 when the current weight is the first weight (for example, a difference D1 between the value W1 and the value W0). In other words, in response to an acceleration request, when the current weight is the increased weight that is larger than the reference weight, the control unit 182 sets a larger distribution amount of electric power that is to be supplied from the secondary battery 140 to the motor 136, compared with the distribution amount of electric power set when the current weight is the reference weight. Even when an acceleration request increases the required amount of power of the motor 136, such setting enables a larger amount of electric power to be supplied from the secondary battery 140 to the motor 136 and thereby suppresses reduction of the power generation efficiency of the fuel cell 110.

When the current weight calculated by the weight acquirer 184 is the increased weight that is larger than the reference weight, the charge discharge controller 185 sets the upper limit value of the SOC to the value Ha1 that is higher than the upper limit value set at the reference weight, while setting the lower limit value of the SOC to the value La1 that is lower than the lower limit value set at the reference value. Such setting expands a range of the amount of electric power suppliable from the secondary battery 140 to the motor 136, in order to allow for power generation in a range of the high power generation efficiency of the fuel cell 110 in response to the required amount of electric power of the fuel cell vehicle 10. Even when the current weight is larger than the reference weight, this configuration accordingly suppresses reduction of the power generation efficiency of the fuel cell 110.

B. Second Embodiment

Figure 7:
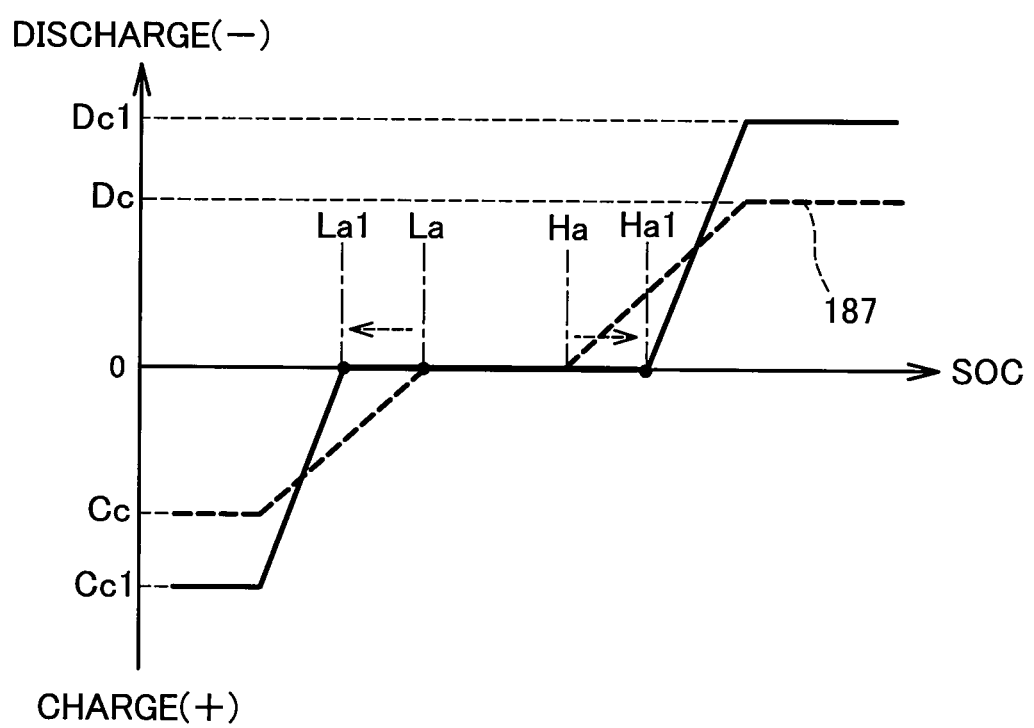
FIG. 7 is a diagram illustrating the control content performed by the charge discharge controller according to a second embodiment.

FIG. 7 is a diagram illustrating the control content performed by the charge discharge controller 185 according to a second embodiment. According to the first embodiment described above, when the current weight is the increased weight that is larger than the reference weight, the charge discharge controller 185 sets the upper limit value of the SOC to the value Ha1 that is higher than the upper limit value set at the reference weight, while setting the lower limit value of the SOC to the value La1 that is lower than the lower limit value set at the reference value. According to the second embodiment, the charge discharge controller 185 further sets higher values to maximum values of the discharging amount [mAh] and the charging amount [mAh] of the secondary battery 140, in addition to the control of the first embodiment described above. More specifically, the charge discharge controller 185 corrects the reference SOC map 187, such as to provide higher values as the maximum value of the discharging amount and as the maximum value of the charging amount of the secondary battery 140 at the increased weight, compared with the maximum values of the discharging amount and the charging amount set at the reference weight. For example, it is assumed that the maximum value of the discharging amount is set to a value Dc and the maximum value of the charging amount is set to a value Cc in the reference SOC map 187. In this example, the charge discharge controller 185 corrects the reference SOC map 187, such that the maximum value of the discharging amount and the maximum value of the charging amount set at the increased weight respectively become equal to a value Dc1 and a value Cc1. The actual charging amount and the actual discharging amount are controlled by controlling the DC-DC converter 134 (shown in FIG. 1). According to a modification, the charge discharge controller 185 may correct the reference SOC map 187, such that the maximum value of the charging amount and the maximum value of the discharging amount gradually increase with an increase in the current weight from the reference weight.

The configuration of the second embodiment has the following advantageous effects, in addition to the advantageous effects of the first embodiment described above. An increase in the current weight from the reference weight results in increasing the amount of electric power that is to be supplied to the motor 136 and increasing the amount of regenerative power generated by the motor 136, in order to provide the same acceleration or provide the same deceleration. The configuration of the second embodiment sets the higher values to the discharging amount and the charging amount of the secondary battery 140 at the increased weight, compared with the discharging amount and the charging amount set at the reference weight and thereby enhances the power performance of the fuel cell vehicle 10. The configuration of the second embodiment also enables a higher distribution of the required amount of electric power to be supplied not by the fuel cell 110 but by the secondary battery 140 transiently, for example, at the time of acceleration of the fuel cell vehicle 10. This configuration accordingly enables the fuel cell 110 to generate electric power at an operation point having the higher power generation efficiency of the fuel cell 110.

C. Other Embodiments

C-1. Another Embodiment 1

In each of the embodiments described above, in response to an acceleration request of the fuel cell vehicle 10, the control unit 182 sets the larger distribution amount of electric power that is to be supplied from the secondary battery 140 to the motor 136 when the current weight is the increased weight, compared with the distribution amount of electric power set when the current weight is the reference weight. This setting is, however, not essential. A modification may set the same distribution amount of electric power that is to be supplied from the secondary battery 140 to the motor 136 at the increased weight as the distribution amount of electric power at the reference weight, as long as the fuel cell 110 is operable in a range of the operation point having the higher power generation efficiency of the fuel cell 110 to supply electric power to the motor 136.

C-2. Another Embodiment 2

According to a modification of each of the embodiments described above, the control unit 182 may change an accelerator torque map used for control according to the current weight of the fuel cell vehicle 10. The accelerator torque map denotes a map indicating a relationship between the depression amount of the accelerator and the torque of the motor 136 and is stored in the storage unit 189 (shown in FIG. 2). The accelerator torque map at the reference weight may be stored in the storage unit 189. The control unit 182 may correct the accelerator torque map, such that the torque generated in response to a fixed depression amount of the accelerator decreases with a decrease in the current weight from the reference weight. The control unit 182 may also correct the accelerator torque map, such that the torque generated in response to a fixed depression amount of the accelerator increases with an increase in the current weight from the reference weight. The control unit 182 may use the corrected accelerator torque map to perform torque control. This configuration enables the same acceleration feeling to be given to the occupants of the fuel cell vehicle 10 at the same depression amount of the accelerator, irrespective of a variation in the current weight.

C-3. Another Embodiment 3

According to a modification of each of the embodiments described above, the fuel cell vehicle 10 may store the fuel consumption rates of respective drivers and may display driving operations of another driver providing a high fuel consumption rate in a monitor or the like provided in the vehicle, for a certain driver providing a low fuel consumption rate, so as to encourage the certain driver to perform the driving operations providing the high fuel consumption rate. Prior to a start of driving operations by a driver, the control unit 182 may receive information for identifying the driver (for example, the driver's license number).

C-4. Another Embodiment 4

According to a modification, the weight acquirer 184 may use Expressions (1) to (4) given below to calculate the current mass (kg) of the fuel cell vehicle 10 and thereby calculate the current weight (kgf) of the fuel cell vehicle 10.

An equation of motion of the fuel cell vehicle 10 during acceleration is expressed by Expression (1) given below:

$$F-R=(m+mr)\cdot\alpha \qquad (1)$$

where F denotes a driving force (N) of the fuel cell vehicle 10, R denotes a running resistance (N) of the fuel cell vehicle 10, m denotes a mass (kg) mounted on the fuel cell vehicle 10, mr denotes a vehicle mass (kg) of the fuel cell vehicle 10, α denotes an acceleration (m/s$^2$) of the fuel cell vehicle 10. The mounted mass m is a sum of the mass of the occupants riding in the vehicle and the mass of luggage mounted on the vehicle. The sum of the mounted mass m and the vehicle mass mr is the current mass M. The vehicle mass mr is a known value.

Accordingly, the weight acquirer 184 can determine the current mass M of the fuel cell vehicle 10, based on the acceleration a, the running resistance R and the driving force F of the fuel cell vehicle 10.

The running resistance R of the fuel cell vehicle 10 is expressed by Expression (2) given below:

$$R=\mu r\cdot M+\mu a\cdot A\cdot V^2+M\cdot g\cdot\sin\theta \qquad (2)$$

where μr denotes a rolling resistance coefficient, μa denotes a pneumatic resistance coefficient, A denotes a vehicle front face projected area (m$^2$), V denotes a vehicle speed (m/s), θ denotes an inclination (deg) in a front-back direction (longitudinal direction) of the fuel cell vehicle 10, and g denotes a gravitational acceleration (m/s$^2$). The rolling resistance coefficient μr, the pneumatic resistance coefficient μa and the vehicle front face projected area A are given in advance as values intrinsic to the fuel cell vehicle 10. The inclination in the longitudinal direction of the fuel cell vehicle 10 may be calculated, for example, by using a tilt sensor (not shown). By substituting Expression (2) into Expression (1), the current mass M of the fuel cell vehicle 10 is expressed by Expression (3) given below:

$$M=(F-\mu a \cdot A \cdot V^2)/(\mu r + g \cdot \sin \theta + \alpha) \qquad (3)$$

The driving force F of the fuel cell vehicle 10 is expressed by Expression (4) given below:

$$F=k1 \cdot (Te \cdot it \cdot if)/Rw \qquad (4)$$

where Te denotes a motor torque (N·m), 'it' denotes a transmission gear ratio, 'if' denotes a final gear ratio, Rw denotes a wheel diameter (m), and k1 denotes a coefficient. The motor torque Te is calculated by referring to a torque characteristic map that is based on a rotation speed N of the motor and a depression amount P of the accelerator and that is stored in the storage unit 189. The transmission gear ratio 'it' is estimated by using the vehicle speed V and the rotation speed N of the motor. The final gear ratio 'if' and the coefficient k1 are given in advance as values intrinsic to the fuel cell vehicle 10.

The present disclosure is not limited to any of the embodiments described above but includes various modifications. For example, the foregoing describes the embodiments in detail for the purpose of clearly illustrating the present disclosure, and the present disclosure is not necessarily limited to the configurations having all the components described above. Part of the configuration of a certain embodiment may be replaced by the configuration of another embodiment. The configuration of another embodiment may be added to the configuration of a certain embodiment. Another configuration may be added to part of the configuration of each of the embodiments. Part of the configuration of each of the embodiments may be omitted or may be replaced with the configuration of another embodiment. The configuration of each of the embodiments may be combined with the configuration of another embodiment and a modification. The present disclosure may be implemented by aspects described below.

(1) According to one aspect of the present disclosure, there is provided a fuel cell vehicle. This fuel cell vehicle comprises a motor configured to perform a regenerative operation and to drive the fuel cell vehicle; a fuel cell configured to supply electric power to the motor; a secondary battery connected to be electrically in parallel to the fuel cell and configured to supply electric power to the motor and to be charged with electric power generated by the fuel cell and with regenerative power generated by the regenerative operation; and a control unit configured to control charge and discharge of the secondary battery, such that a state of charge of the secondary battery is placed between an upper limit value and a lower limit value. The control unit comprises a weight acquirer configured to obtain a current weight of the fuel cell vehicle; and a charge discharge controller configured to set a higher value to the upper limit value and to set a lower value to the lower limit value when the current weight calculated by the weight acquirer is an increased weight that is larger than a reference value, compared with the upper limit value and the lower limit value set when the current weight is the reference weight. In the fuel cell vehicle of this aspect, when the current weight calculated by the weight acquirer is the increased weight that is larger than the reference weight, the charge discharge controller sets the upper limit value of the state of charge to the higher value than the upper limit value set at the reference weight, while setting the lower limit value of the state of charge to the lower value than the lower limit value set at the reference value. Such setting expands a range of the amount of electric power suppliable from the secondary battery to the motor, in order to allow for power generation in a range of a high power generation efficiency of the fuel cell in response to a required amount of electric power of the fuel cell vehicle. In the state that the current weight is larger than the reference weight, even in the case of an increase in the amount of electric power that is to be supplied to the motor, this configuration is allowed to increase the amount of electric power that is suppliable from the secondary battery to the motor and thereby suppresses reduction of the power generation efficiency of the fuel cell.

(2) In the fuel cell vehicle of the above aspect, the charge discharge controller may set higher values to a discharging amount and a charging amount of the secondary battery at the increased weight, compared with a discharging amount and a charging amount set at the reference weight. An increase in the current weight from the reference weight results in increasing the amount of electric power that is to be supplied to the motor and increasing the amount of regenerative power generated by the motor, in order to provide the same acceleration or provide the same deceleration. The configuration of this aspect sets the higher values to the discharging amount and the charging amount of the secondary battery at the increased weight, compared with the discharging amount and the charging amount set at the reference weight and thereby enhances the power performance of the fuel cell vehicle. The configuration of this aspect also enables a higher distribution of the required amount of electric power to be supplied not by the fuel cell but by the secondary battery transiently, for example, at the time of acceleration of the fuel cell vehicle. This configuration accordingly enables the fuel cell to generate electric power at an operation point having the higher power generation efficiency of the fuel cell.

(3) In the fuel cell vehicle of the above aspect, in response to an acceleration request of the fuel cell vehicle, the charge discharge controller may set a larger distribution amount of electric power that is to be supplied from the secondary battery to the motor at the increased weight, compared with a distribution amount of electric power set at the reference weight. Even when an acceleration request increases the required amount of electric power of the motor, the configuration of this aspect enables a larger amount of electric power to be supplied from the secondary battery to the motor and thereby suppresses reduction of the power generation efficiency of the fuel cell.

The present disclosure may be implemented by various aspects other than the aspects of the fuel cell vehicle described above. For example, the present disclosure may be implemented by the aspects of a control method of the fuel cell vehicle and a program that performs the control method.

What is claimed is:

1. A fuel cell vehicle, comprising:
    a motor configured to perform a regenerative operation and to drive the fuel cell vehicle;
    a fuel cell configured to supply electric power to the motor;
    a secondary battery connected to be electrically in parallel to the fuel cell and configured to supply electric power to the motor and to be charged with electric power generated by the fuel cell and with regenerative power generated by the regenerative operation; and
    a control unit configured to control charge and discharge of the secondary battery, such that a state of charge (SOC) of the secondary battery is placed between an upper limit value of the SOC of the secondary battery and a lower limit value of the SOC of the secondary battery, wherein
    the control unit comprises:
    a weight acquirer configured to obtain a current weight of the fuel cell vehicle; and a charge discharge controller configured to set a higher value to the upper limit value and to set a lower value to the lower limit value when the current weight calculated by the weight acquirer is an increased weight that is larger than a reference value, compared with the upper limit value and the lower limit value set when the current weight is the reference weight.

2. The fuel cell vehicle according to claim 1, wherein the charge discharge controller sets higher values to a discharging amount and a charging amount of the secondary battery at the increased weight, compared with a discharging amount and a charging amount set at the reference weight.

3. The fuel cell vehicle according to claim 1, wherein in response to an acceleration request of the fuel cell vehicle, the charge discharge controller sets a larger distribution amount of electric power that is to be supplied from the secondary battery to the motor at the increased weight, compared with a distribution amount of electric power set at the reference weight.

4. A fuel cell vehicle, comprising:
a motor configured to perform a regenerative operation and to drive the fuel cell vehicle;
a fuel cell configured to supply electric power to the motor;
a secondary battery connected to be electrically in parallel to the fuel cell and configured to supply electric power to the motor and to be charged with electric power generated by the fuel cell and with regenerative power generated by the regenerative operation; and
a control unit configured to control charge and discharge of the secondary battery, such that a state of charge of the secondary battery is placed between an upper limit value and a lower limit value, wherein
the control unit comprises:
a weight acquirer configured to obtain a current weight of the fuel cell vehicle; and
a charge discharge controller configured to set a higher value to the upper limit value and to set a lower value to the lower limit value when the current weight calculated by the weight acquirer is an increased weight that is larger than a reference value, compared with the upper limit value and the lower limit value set when the current weight is the reference weight;
wherein the control unit controls such that a torque generated in response to a fixed depression amount of an accelerator decreases with a decrease in the current weight from the reference weight.

5. A fuel cell vehicle, comprising:
a motor configured to perform a regenerative operation and to drive the fuel cell vehicle;
a fuel cell configured to supply electric power to the motor;
a secondary battery connected to be electrically in parallel to the fuel cell and configured to supply electric power to the motor and to be charged with electric power generated by the fuel cell and with regenerative power generated by the regenerative operation; and
a control unit configured to control charge and discharge of the secondary battery, such that a state of charge of the secondary battery is placed between an upper limit value and a lower limit value, wherein
the control unit comprises:
a weight acquirer configured to obtain a current weight of the fuel cell vehicle; and
a charge discharge controller configured to set a higher value to the upper limit value and to set a lower value to the lower limit value when the current weight calculated by the weight acquirer is an increased weight that is larger than a reference value, compared with the upper limit value and the lower limit value set when the current weight is the reference weight;
wherein the control unit controls such that a torque generated in response to a fixed depression amount of an accelerator increases with an increase in the current weight from the reference weight.

6. The fuel cell vehicle according to claim 1, wherein the fuel cell vehicle comprises a storage unit configured to store fuel consumption rates of respective drivers, wherein the control unit displays driving operations of another driver providing a high fuel consumption rate in a monitor provided in the vehicle, for a certain driver providing a low fuel consumption rate.

* * * * *